(12) United States Patent
Greiner et al.

(10) Patent No.: US 7,483,808 B2
(45) Date of Patent: Jan. 27, 2009

(54) SYSTEM AND METHOD FOR MEASURING MACHINE ROLLING RESISTANCE

(75) Inventors: Jonny R. Greiner, Dunlap, IL (US); Yang Liu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/819,879

(22) Filed: Jun. 29, 2007

(65) Prior Publication Data

US 2009/0006007 A1    Jan. 1, 2009

(51) Int. Cl.
*G01L 5/13* (2006.01)
*G01L 5/12* (2006.01)
*G01L 3/26* (2006.01)
*G06F 19/00* (2006.01)
*G01M 19/00* (2006.01)

(52) U.S. Cl. .......................... 702/166; 33/521; 73/146; 702/1; 702/33; 702/34; 702/127

(58) Field of Classification Search .................. 33/521; 73/104, 146; 340/988, 995.27; 700/200, 700/201, 207, 213; 702/1, 33, 34, 41, 127, 702/150, 155, 158, 166, 182, 187, 189
See application file for complete search history.

(56) References Cited

U.S. PATENT DOCUMENTS

| | | | | |
|---|---|---|---|---|
| 3,383,913 | A * | 5/1968 | Swift | 73/146 |
| 3,453,877 | A * | 7/1969 | Anderson | 73/146 |
| 3,459,038 | A * | 8/1969 | Swift | 73/146 |
| 5,584,305 | A * | 12/1996 | Riche | 128/898 |
| 5,787,378 | A | 7/1998 | Schricker | |
| 5,832,400 | A * | 11/1998 | Takahashi et al. | 701/53 |
| 6,151,537 | A * | 11/2000 | Gheordunescu et al. | 701/1 |
| 6,188,942 | B1 | 2/2001 | Corcoran et al. | |
| 6,282,465 | B1 * | 8/2001 | Nishijima et al. | 701/1 |
| 6,306,062 | B1 * | 10/2001 | Toukura et al. | 477/107 |
| 6,308,128 | B1 * | 10/2001 | Nishijima et al. | 701/93 |
| 6,324,461 | B1 * | 11/2001 | Yamaguchi et al. | 701/80 |
| 6,546,329 | B2 | 4/2003 | Bellinger | |
| 6,604,040 | B2 * | 8/2003 | Kawasaki et al. | 701/80 |
| 6,944,532 | B2 | 9/2005 | Bellinger | |
| 6,957,139 | B2 * | 10/2005 | Bellinger | 701/104 |
| 2002/0116145 | A1 * | 8/2002 | Kawasaki et al. | 702/148 |
| 2002/0132699 | A1 * | 9/2002 | Bellinger | 477/107 |

(Continued)

FOREIGN PATENT DOCUMENTS

JP        11-139293 A   *   5/1999

*Primary Examiner*—Edward R Cosimano
(74) *Attorney, Agent, or Firm*—Finnegan, Henderson, Farabow, Garrett & Dunner

(57) ABSTRACT

A method of measuring rolling resistance of a machine is disclosed. The method may include determining a drive axle torque value of the machine and calculating a total effective grade value using the drive axle torque value. The method may further include determining at least one drivetrain efficiency loss factor value and calculating a total drivetrain efficiency loss value of the machine using the at least one drivetrain efficiency loss factor value. The method may also include determining position data of the machine and calculating an actual grade value based on the position data. The method may additionally include calculating a rolling resistance value of the machine by subtracting the actual grade value and the drivetrain efficiency loss value from the total effective grade value and outputting the rolling resistance value.

20 Claims, 3 Drawing Sheets

U.S. PATENT DOCUMENTS

2003/0216847 A1* 11/2003 Bellinger ................. 701/51
2004/0002806 A1* 1/2004 Bellinger ................. 701/104
2007/0143002 A1* 6/2007 Crowell et al. ............ 701/123

* cited by examiner

SYSTEM AND METHOD FOR MEASURING MACHINE ROLLING RESISTANCE

TECHNICAL FIELD

The present disclosure relates generally to a measurement system and, more particularly, to a measurement system and method for calculating rolling resistance of a machine.

BACKGROUND

Measurement systems are used to optimize the performance of machines. It is typical for measurement systems to use data to optimize performance of an engine or transmission of a machine. Additionally, it is common for measurement systems to improve performance of other machine systems including braking, cooling, and suspension systems. In order to accomplish performance optimization, various components including sensors, controllers, receivers, and transmitters are used to gather and process data into useful information.

A rolling machine moves by rolling on wheels or tracks in order to be positioned to perform work. One aspect of a rolling machine that can be measured is the rolling resistance of the machine. The rolling resistance corresponds to a percentage of a generally horizontal force required to move a wheel compared to a generally vertical force acting on the wheel normal to the horizontal force. It is desirable to measure rolling resistance of rolling machines for various reasons. For example, determination of the rolling resistance of a machine may assist in making the machine more efficient and reduce operating costs by indicating ways to improve fuel economy, power train life, and tire life of the machine. Additionally, determination of rolling resistance may assist in improving roadway management, whereby irregular spots in the roadway that reduce machine efficiency may be identified and improved. Despite the advantageous reasons for measuring rolling resistance, it has proven difficult to determine.

One way to determine a machine's rolling resistance is disclosed in U.S. Pat. No. 5,787,378 (the '378 patent) issued to Schricker. The '378 patent describes a system and method for determining a resistance factor of a machine to detect an abnormal condition. The system includes sensors, a controller, and a transmitter. The '378 patent calculates a resistance factor using various inputs including vehicle weight, wind resistance, and net rimpull via onboard sensors or computer models. Additionally, the '378 patent uses a positioning means, such as a GPS, to determine the location of the machine. The '378 patent compares the individual machine resistance factor to a fleet average to detect an abnormal condition, such as, an under-inflated tire.

Although the measurement system of the '378 patent may help to determine a resistance factor of a machine, it may be complex and have an excessive number of sensors that may increase costs. For example, the '378 patent requires an individual machine's resistance factor to be compared to a continuously updated average fleet resistance factor to determine abnormal conditions. Continuously updating average fleet resistance is complex and requires considerable processing power. Further, in calculating the resistance factor, the '378 patent relies upon the determination of wind resistance using a sensor and coefficient of drag. Additionally, when calculating net rimpull, the '378 patent relies upon braking power as measured by sensors or determined by computer based models. The '378 patent's use of sensors or computer models to determine wind resistance and braking power to calculate the resistance factor increases complexity of the system.

The disclosed measurement system is directed to overcoming one or more of the problems set forth above.

SUMMARY OF THE INVENTION

In one aspect, the present disclosure is directed to a method of measuring rolling resistance of a machine. The method may include determining a drive axle torque value of the machine and calculating a total effective grade value using the drive axle torque value. The method may further include determining at least one drivetrain efficiency loss factor value and calculating a total drivetrain efficiency loss value of the machine using the at least one drivetrain efficiency loss factor value. The method may also include determining position data of the machine and calculating an actual grade value based on the position data. The method may additionally include calculating a rolling resistance value of the machine by subtracting the actual grade value and the drivetrain efficiency loss value from the total effective grade value and outputting the rolling resistance value.

In another respect, the present disclosure is directed to a measurement system for calculating rolling resistance of a machine. The measurement system may include a sensor and a position location system. The measurement system may further include a controller configured to convert a drive axle torque value sensed by the sensor into a total effective grade value and calculate a drivetrain efficiency loss value from at least one drivetrain efficiency loss factor value. The controller may be additionally configured to calculate an actual grade value as determined by the position location system and calculate a rolling resistance value by subtracting the actual grade value and the drivetrain efficiency loss value from the total effective grade value.

DETAILED DESCRIPTION

Figure 1:
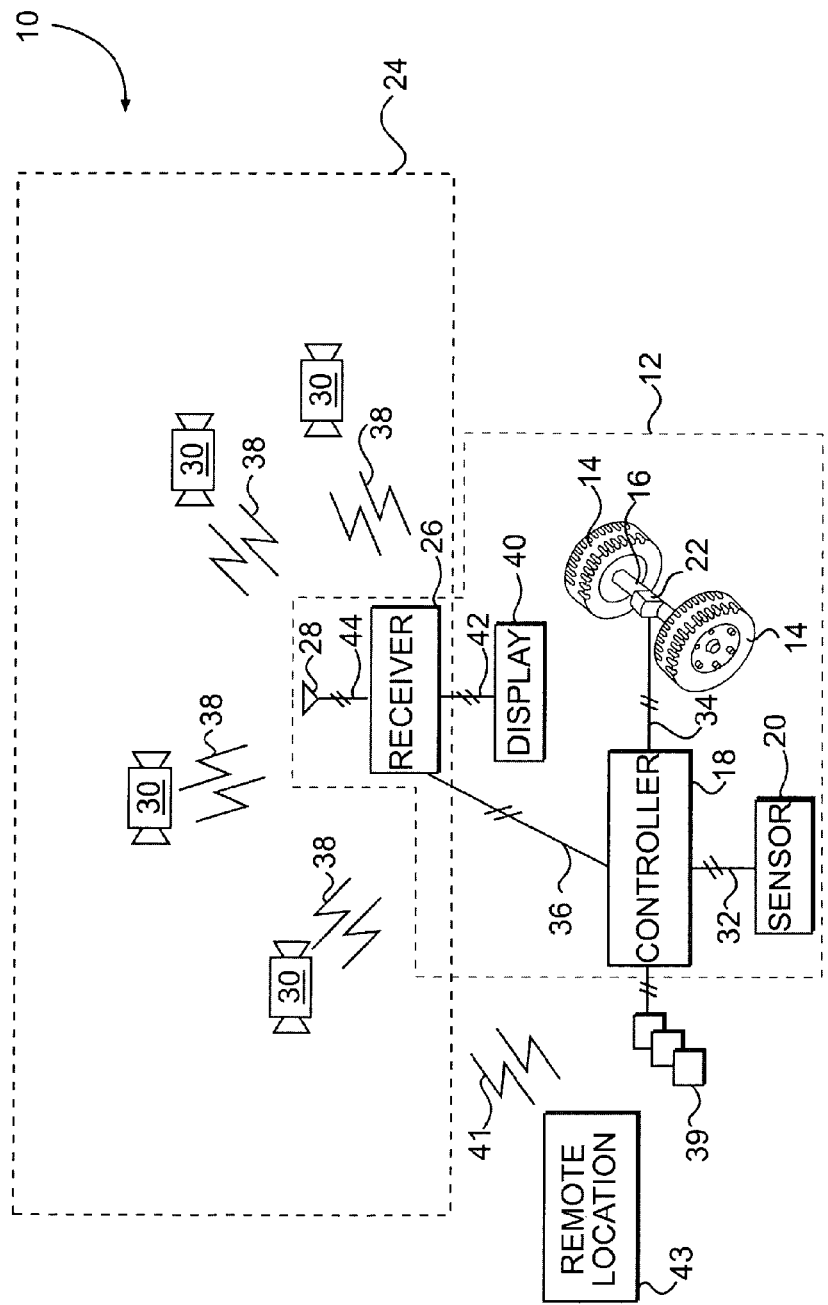
FIG. 1 is a pictorial and schematic illustration of an exemplary disclosed measurement system.

FIG. 1 illustrates a measurement system 10. Measurement system 10 may be incorporated in a machine 12. Machine 12 may perform some type of operation associated with an industry, such as, mining, construction, farming, transportation, or any other industry known in the art. For example, machine 12 may be a mining machine used for hauling mining material. Machine 12 may be a rolling machine including traction devices 14 for traversing a surface. Traction devices 14 may be wheels or tracks. Traction devices 14 may include rubberized tires for increased traction. Machine 12 may include an axle 16 attached to traction devices 14, which permits machine 12 to move from a first position to a second position.

Measurement system 10 may further include a controller 18, a machine sensor 20, a torque sensor 22, and a position location system 24. Controller 18 may be in communication with machine sensor 20, torque sensor 22, and position location system 24 via communication lines 32, 34, and 36, respectively. It is contemplated that controller 18, machine sensor 20, torque sensor 22, and position location system 24 may measure and process data related to operating conditions of machine 12.

Controller 18 may receive data from machine sensor 20, torque sensor 22, and position location system 24. Machine sensor 20 may send data to controller 18 indicative of operating conditions of machine 12. Torque sensor 22 may send data to controller 18 indicative of real-time machine drive axle torque. Based on the measured machine drive axle torque, controller 18 may convert the machine drive axle torque data to a total effective grade value. Further, position location system 24 may send data to controller 18 indicative of real-time geographic position of machine 12. In particular, position location system 24 may send geographic position data sufficient to determine an actual grade value. Additionally, controller 18 may determine a drivetrain efficiency loss value in the machine between sensor 20 or 22 and the surface of the ground. Using input data from machine sensor 20, torque sensor 22, and position location system 24, controller 18 may calculate rolling resistance by subtracting a drivetrain efficiency loss value and an actual grade value from a total effective grade value.

Machine sensor 20 may include a single sensor or a plurality of sensors that monitor one or more machine operating conditions. For example, machine sensor 20 may be a machine speed sensor, an engine load sensor, a machine orientation sensor, and/or any other known sensor for detecting machine operating conditions.

Torque sensor 22 may be located on axle 16 and near one of the traction devices 14. It is contemplated that torque sensor 22 may be located in close proximity to one of the traction devices 14 and, more specifically, in close proximity to a rear traction device 14 of machine 12. Torque sensor 22 may include, for example, a strain gauge. Alternatively, torque sensor 22 may be any other type of sensor capable of monitoring machine drive axle torque.

Machine drive axle torque may be estimated using one of several different methods. First, machine drive axle torque may be estimated by torque sensor 22. Second, machine drive axle torque may be estimated with input from one or more machine sensors 20. Machine sensors 20 may monitor operating conditions other than torque and, through the use of an algorithm be used to estimate machine drive axle torque. The algorithm may be refined using test data until the algorithm proves to be sufficiently precise. Third, it may be advantageous to use a torque sensor 22 in combination with one or more machine sensors 20 to estimate machine drive axle torque.

It is contemplated that if an algorithm is relied upon to estimate machine drive axle torque, then the algorithm may be tested and modified to a predetermined degree of precision. For example, the predetermined degree of precision of the estimated machine drive axle torque may be required to be within 1% of the actual machine drive axle torque. In this situation, if the estimated machine drive axle torque varies by an amount greater than the predetermined amount of 1%, then the algorithm may be modified to improve its ability to precisely estimate machine drive axle torque. Use of an algorithm, in place of torque sensor 22, may be advantageous to reduce the cost of adding additional hardware to machine 12.

Position location system 24 may include a receiver 26, an antenna 28, and one or more remote positioning devices 30. Receiver 26 and antenna 28 may be located on machine 12. Remote positioning device 30 may be located remote from machine 12. Receiver 26, antenna 28, and one or more remote positioning devices 30 may be used to determine position data of machine 12 including a change in elevation and a change in distance between two locations.

Receiver 26 may be a global positioning system (GPS) receiver located on machine 12. Receiver 26 may calculate its position by measuring the distance between itself and three or more remote positioning devices 30. Additionally, receiver 26 may include a receiver-processor (not shown), antenna 28, and a clock (not shown). Receiver 26 may communicate with controller 18 via communication line 36 to provide position location data for determining rolling resistance or any other calculation that may require position information. It is contemplated that receiver 26 may communicate position data to a display 40 via communication line 42 for providing visual position data to an operator. Display 40 may be located in an operator cab (not shown) of machine 12. Alternatively, display 40 may be in communication with controller 18 via a separate communication line (not shown) after receiver 26 sends position information to controller 18.

Antenna 28 may be located on machine 12 and in communication with receiver 26. Antenna 28 may be integrated in receiver 26 or positioned near receiver 26. Alternatively, antenna 28 may be located on machine 12 but distant from receiver 26 and communicate with receiver 26 via communication line 44. Antenna 28 may be tuned to frequencies transmitted by the remote positioning devices 30.

Remote positioning devices 30 may be GPS Earth orbiting satellites. Alternatively, remote positioning devices 30 may be located near the surface of the Earth to provide location data. Antenna 28 and receiver 26 may send and receive signals 38 from remote positioning devices 30 and measure the time delay between transmission and reception of each signal 38 to determine the distance to each remote positioning device 30. It is contemplated that signal 38 may be a radio signal. Alternatively, signal 38 may be any type of signal capable of transmitting position location data. Receiver 26 may compute its position, using trilateration, from distance data determined from at least three remote positioning devices 30. Four or more remote positioning devices 30 may be necessary to determine elevation and grade of machine 12. Receiver 26 may calculate in real-time the actual grade of the surface. Alternatively, position data may be sent from receiver 26 to controller 18 for calculating actual grade. It is contemplated that machine sensor 20 may include an orientation sensor for detecting the pitch/yaw/roll of machine 12 to help determine the actual grade of the surface.

INDUSTRIAL APPLICABILITY

The disclosed measurement system may be used in any machine that rolls. In particular, the disclosed system may be used in a machine that functions with rolling resistance.

The operation of measurement system 10 will now be described. During operation of measurement system 10, machine 12 may travel along a surface. The surface may be composed of various materials including asphalt, concrete, soil, gravel, or other materials. Further, the surface may be a roadway. More specifically, the surface may be a mining haul road. As machine 12 travels, the rolling resistance of the machine 12 may vary depending on numerous factors including surface grade, wheel conditions (i.e., tread wear, inflation, dimensions, etc.), gross machine weight, surface material, and surface irregularities. For example, as a mining machine ascends a haul road, the rolling resistance may vary as the machine travels over an irregular surface. In this situation, the rolling resistance may likely increase when the machine transitions from a substantially smooth surface to the irregular surface. It may be desirable to determine rolling resistance information to improve machine efficiency and roadway management. For example, determination of rolling resistance of a machine may assist in increasing machine efficiency and reduce operating costs by improving fuel economy, power train life, and tire life. Additionally, determination of rolling resistance may assist in improving roadway management, whereby irregular spots in the roadway that reduce machine efficiency may be identified and improved.

Figure 2:
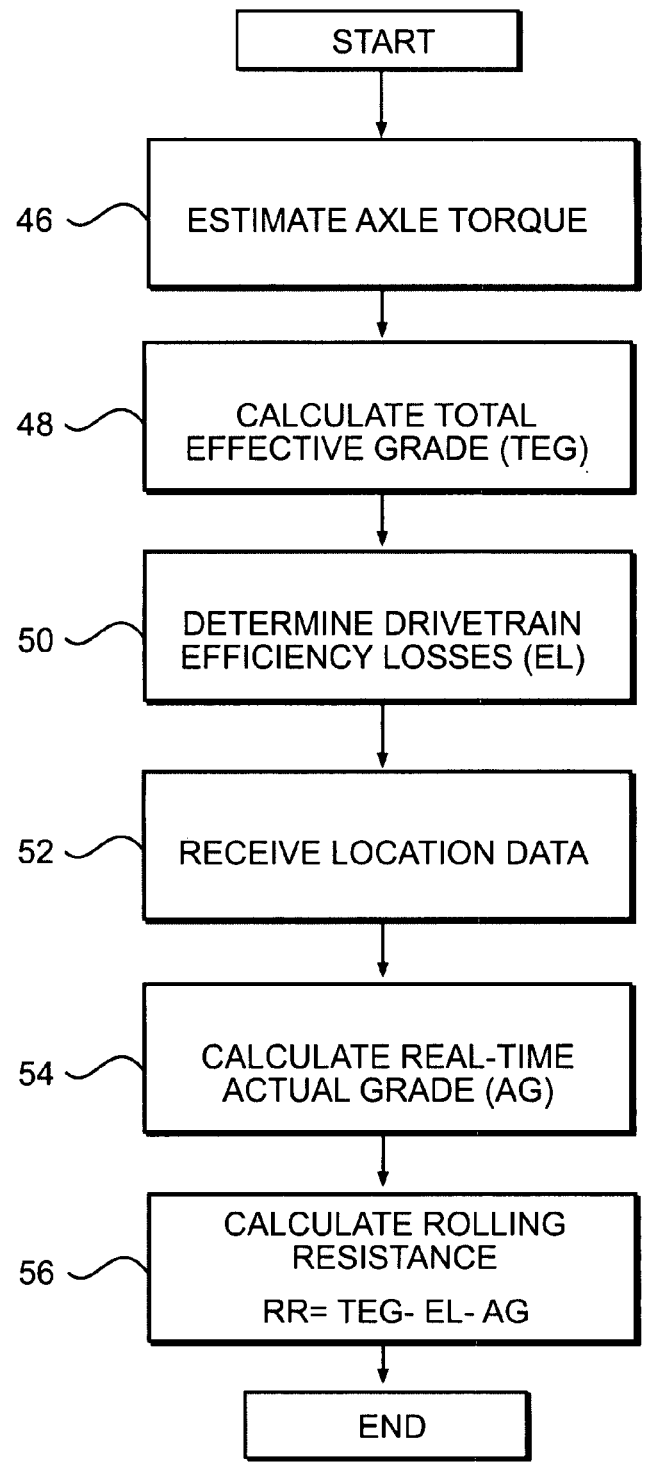
FIG. 2 is a flow-diagram illustrating a method of calculating rolling resistance.

FIG. 2 shows a flow diagram outlining the steps associated with determining rolling resistance. In control block 46, measurement system 10 may determine machine drive axle torque by one of the several methods previously mentioned. Machine drive axle torque may be measured by torque sensor 22, by one or more machine sensors 20 with an algorithm, or by a combination of torque sensor 22 and one or more machine sensors 20 with an algorithm.

In control block 48, once an estimated machine drive axle torque is determined, controller 18 may calculate a total effective grade value. A total effective grade value may be determined from various factors including machine speed (MS), machine acceleration (MA), engine load factor (ELF), gross machine weight (GMW), acceleration due to gravity (AG), and rimpull (RP). Machine speed, machine acceleration, and engine load factor may determined via machine sensors 20 and conventional calculations. Gross machine weight may be determined from empirical data in look-up tables 39 (see FIG. 1) or calculated in real-time via machine sensors 20 and conventional calculations. Rimpull may be calculated using the estimated machine drive axle torque (DAT) determined by torque sensor 22 or machine sensors 20. Additionally, calculation of rimpull may include other components including a tire dynamic rolling radius (TDRR), an overall lower power train reduction (PTR), and an overall lower power train efficiency (PTE). For example, rimpull (RP) may be calculated with the following equation:

$$RP=(DAT*PTR*PTE)/TDRR.$$

In metric units, rimpull (RP) may be expressed in newtons, machine drive axle torque (DAT) may be expressed in newton-meters, and tire dynamic rolling radius (TDRR) may be expressed in meters. Overall lower power train reduction (PTR) and overall power train efficiency (PTE) are factors not measured in units.

It is contemplated that total effective grade (TEG), corresponding to machine operating conditions that form a factor to measure machine rolling resistance, may be set to zero unless vehicle speed or engine load factor are above a predetermined value. Alternatively, total effective grade may be set to zero unless both vehicle speed and engine load factor are above a predetermined respective value. For example, it may not be desirable to calculate a total effective grade value when machine 12 is lightly loaded, coasting, or descending. If machine speed and engine load factor are above their predetermined values, then the total effective grade value may be expressed as a percentage and calculated by the following equation:

$$TEG=(RP/GMW)-(MA/AG).$$

In control block 50, measurement system 10 may determine a drivetrain efficiency loss value (EL). Since sensors 20 and 22 monitor machine conditions at points upstream of the end point of the drivetrain, where the traction devices engage the surface, the drivetrain efficiency loss between the sensors 20 and 22 and the surface may be estimated to improve the accuracy of calculating rolling resistance. For example, a drivetrain efficiency loss value may be determined by at least one drivetrain efficiency loss factors including torque converter and pump efficiency polynomial coefficients; transmission efficiency polynomial coefficients by gear; bevel gear efficiency; first reduction final drive efficiency; and second reduction final drive efficiency. It is contemplated that other drivetrain efficiency loss factors may be included in determining the drivetrain efficiency loss value. Drivetrain efficiency loss factors may be determined by empirical data in look-up tables 39 or by real-time monitoring via one or more machine sensors 20. The efficiency loss value may be expressed as a percentage and calculated by adding all desired drivetrain efficiency loss factor values.

In control block 52, position location system 24 may receive location data. As machine 12 moves from a first position to a second position, receiver 26 may communicate with three or more remote positioning devices 30 via antenna 28 to determine position data.

In control block 54, measurement system 10 may calculate an actual grade value (AG) of the surface. The actual grade value may be determined via simple calculations once position data including a change in elevation and a change in distance between two locations is known. For example, an actual grade value may be expressed as a percentage and calculated by dividing the change in elevation by the change in distance between two locations. The measurement system 10 may continuously determine an actual grade value at a predetermined cycle of time. For example, an actual grade value may be determined every second.

In control block 56, measurement system 10 may calculate rolling resistance (RR) of machine 12 using a total effective grade value (TEG), a drivetrain efficiency loss value (EL), and an actual grade value (AG). It is contemplated that rolling resistance may be expressed as a percentage and calculated by the following equation:

$$RR=TEG-(AG+EL).$$

Figure 3:
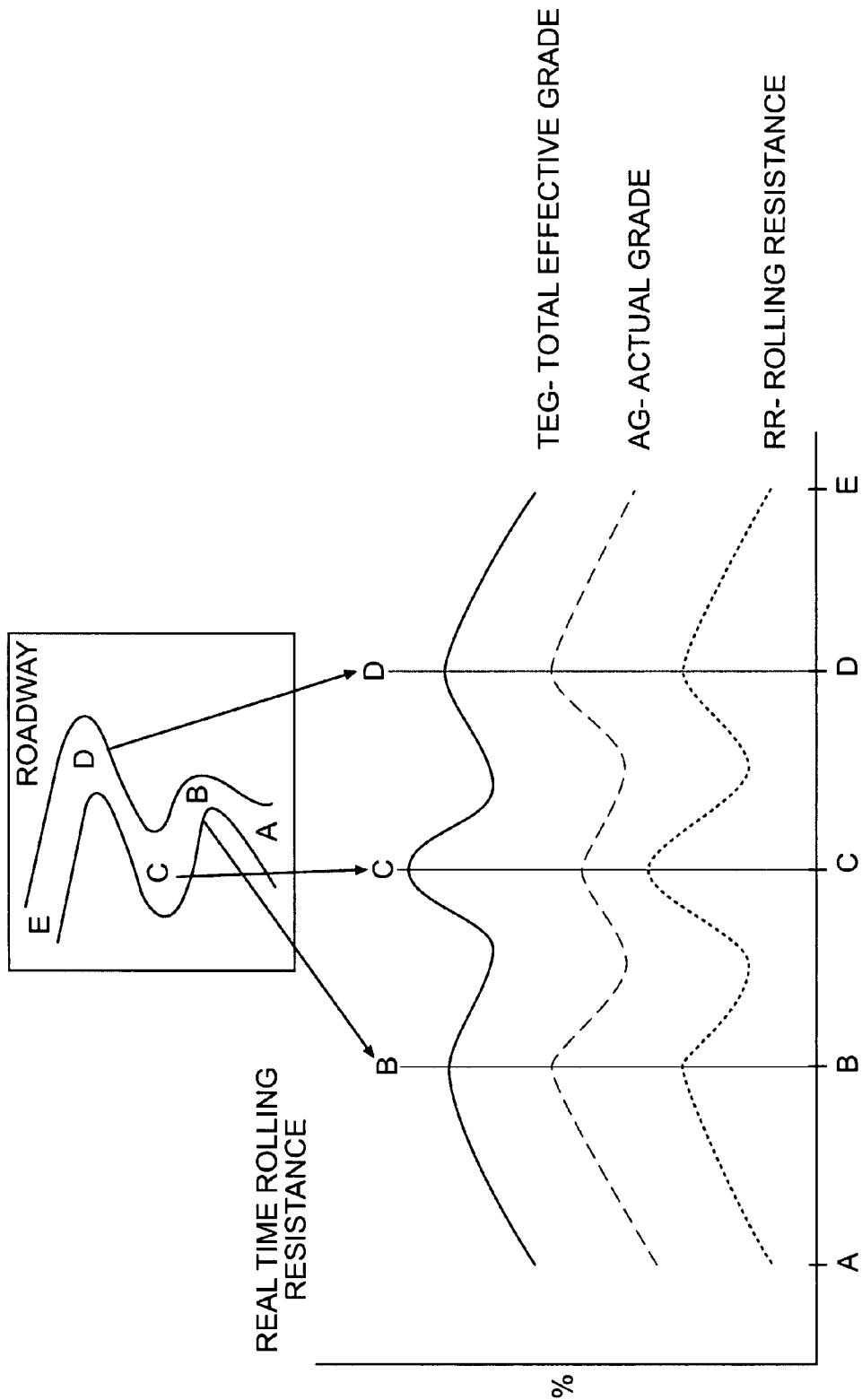
FIG. 3 is a pictorial illustration representing a roadway and a graph illustrating rolling resistance, actual grade, and total effective grade.

FIG. 3 illustrates a roadway and a corresponding graph plotting rolling resistance, total effective grade, and actual grade. The roadway diagram illustrates a roadway that may ascend from point A to point E and may include intermediate points B, C, and D that are each located proximate turns in the roadway. For example, the roadway diagram may be a mine hauling road that generally ascends along its length from point A to point E. As machine 12 travels along the roadway, the rolling resistance of machine 12 may vary dependent on various operating conditions of the machine, as well as, the various conditions of the roadway.

The graph may plot values for total effective grade (TEG), actual grade (AG), and rolling resistance (RR) as machine 12 travels along the roadway from point A to point E. The vertical axis of the graph may relate to a percentage of grade for the actual grade and total effective grade and the percentage of horizontal force required to move traction device 14 compared to a normal force acting on traction device 14 for rolling resistance. The horizontal axis of the graph may relate to the position of machine 12 as it travels along the roadway from point A to point E.

As shown in the graph of FIG. 3, as machine 12 ascends around each turn along the roadway at points B, C, and D, the actual and total effective grades may increase. The increase in grade at each turn may cause increase in rolling resistance of machine 12. Other factors, such as surface irregularities, may cause an additional increase in rolling resistance. For example, the actual grade at point C is substantially the same as points B and D, but the percentage rolling resistance at point C is higher than the percentage rolling resistance at points B and D. Based on the abnormal increase of rolling resistance at point C, an operator may identify other factors beyond surface grade that may have caused the abnormal increase in rolling resistance. For example, point C may suffer from irregular surface conditions, such as loose soil, that may be identified and repaired based on the calculation of rolling resistance.

Once rolling resistance is determined, the data may be outputted to an operator to improve efficiency of the machine 12 or improve roadway management. For example, an operator may use rolling resistance data to spot surface irregularities of a hauling road that may need to be repaired. It is contemplated that rolling resistance data may be accessed at various points in time, from various locations, and by various operators. For example, rolling resistance may be continuously calculated and displayed in real-time to a machine operator to alert the operator of potential problems with the machine 12 or the roadway. Alternatively, rolling resistance data may be analyzed by a remote operator. Rolling resistance data may be sent wirelessly, via signals 41 (see FIG. 1), to a remote location 43 in real-time, at predetermined time intervals, or at predetermined locations along the route. Optionally, rolling resistance data may stored as machine 12 travels and then uploaded at a single point along the route (e.g., the final point in the route).

It will be apparent to those skilled in the art that various modifications and variations can be made to the disclosed measurement system without departing from the scope of the disclosure. Other embodiments of the measurement system will be apparent to those skilled in the art from consideration of the specification and practice of the measurement system disclosed herein. It is intended that the specification and examples be considered as exemplary only, with a true scope of the disclosure being indicated by the following claims and their equivalents.

What is claimed is:

1. A method of measuring rolling resistance of a machine along a surface, comprising:
    determining a drive axle torque value of the machine and calculating a total effective grade value using the drive axle torque value;
    determining at least one drivetrain efficiency loss factor value and calculating a total drivetrain efficiency loss value of the machine using the at least one drivetrain efficiency loss factor value;
    determining position data of the machine and calculating an actual grade value based on the position data;
    calculating a rolling resistance value of the machine by subtracting the actual grade value and the drivetrain efficiency loss value from the total effective grade value; and
    outputting the rolling resistance value to identify a condition of the machine or the surface.

2. The method of claim 1, wherein determining the drive axle torque value includes monitoring drive axle torque with a torque sensor.

3. The method of claim 1, wherein determining the drive axle torque value includes estimating drive axle torque with at least one machine sensor and an algorithm.

4. The method of claim 1, wherein determining at least one drivetrain efficiency loss factor value includes monitoring the at least one drivetrain efficiency loss factor value with at least one machine sensor.

5. The method of claim 1, wherein determining at least one drivetrain efficiency loss factor value includes retrieving the at least one drivetrain efficiency loss factor value from a look-up table.

6. The method of claim 5, wherein determining at least one drivetrain efficiency loss factor value includes retrieving a plurality of drivetrain efficiency loss factor values from a look-up table.

7. The method of claim 1, wherein determining position data of the machine includes communicating with at least one remote positioning device via a receiver to determine a change in elevation and a change in distance between two locations.

8. The method of claim 7, wherein calculating the actual grade based on the position data includes dividing the change in elevation by the change in distance.

9. The method of claim 1, wherein calculating the total effective grade value includes calculating a rimpull value.

10. The method of claim 9, further including determining a tire dynamic rolling radius value; and wherein calculating the rimpull value includes dividing the drive axle torque value by the tire dynamic rolling radius value.

11. The method of claim 10, further including determining a gross machine weight value and a machine acceleration value, and wherein calculating the total effective grade value includes using the rimpull value, the gross machine weight value, the machine acceleration value, and an acceleration of gravity value.

12. The method of claim 1, wherein outputting the rolling resistance value includes outputting the rolling resistance value in real-time.

13. The method of claim 12, wherein outputting the rolling resistance value in real-time includes outputting the rolling resistance value to a remote operator.

14. The method of claim 12, wherein outputting the rolling resistance value in real-time includes outputting the rolling resistance value to a machine operator.

15. A measurement system for calculating rolling resistance of a machine along a surface, comprising:
    a sensor;
    a position location system; and
    a controller configured to convert a drive axle torque value sensed by the sensor into a total effective grade value, determine at least one drivetrain efficiency factor loss value; calculate a drivetrain efficiency loss value from the at least one drivetrain efficiency loss factor value, calculate an actual grade value as determined by the position location system, calculate a rolling resistance value by subtracting the actual grade value and the drivetrain efficiency loss value from the total effective grade value; and output the rolling resistance value to identify a condition of the machine or the surface.

16. The measurement system of claim 15, wherein the sensor is a torque sensor.

17. The measurement system of claim 15, wherein the sensor includes a plurality of sensors.

18. A method of managing a roadway, comprising:
    estimating a drive axle torque value of a machine using at least one machine sensor and an algorithm;
    determining a tire dynamic rolling radius value, a gross machine weight value, and a machine acceleration value;
    calculating a rimpull value by dividing the drive axle torque value by the tire dynamic rolling radius value;
    calculating a total effective grade value using the rimpull value, the gross machine weight value, the machine acceleration value, and an acceleration of gravity value;
    determining at least one drivetrain efficiency loss factor value and calculating a drivetrain efficiency loss value based on the at least one drivetrain efficiency loss factor;
    determining position data of the machine by communicating with a plurality of remote positioning devices via a receiver to determine a change in elevation and a change in distance between two locations;

calculating an actual grade value based on position data by dividing the change in elevation by the change in distance;

calculating a rolling resistance value by subtracting the actual grade value and the drivetrain efficiency loss value from the total effective grade value; and outputting the rolling resistance value to identify a condition of the machine or the roadway.

19. The method of claim 18, wherein outputting the rolling resistance value includes outputting to a remote operator in real-time.

20. The method of claim 18, wherein outputting the rolling resistance value includes outputting to a machine operator in real-time.

* * * * *